United States Patent
Colom Ikuno et al.

(10) Patent No.: US 12,413,959 B2
(45) Date of Patent: Sep. 9, 2025

(54) OPERATION OF A USER EQUIPMENT WITHIN OR AS PART OF A TELECOMMUNICATIONS NETWORK USING A CONTROL PLANE FUNCTIONALITY

(71) Applicant: Deutsche Telekom AG, Bonn (DE)

(72) Inventors: Josep Colom Ikuno, Korneuburg (AT); Reinhard Lauster, St. Poelten (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/294,555

(22) PCT Filed: Aug. 2, 2022

(86) PCT No.: PCT/EP2022/071705
§ 371 (c)(1),
(2) Date: Feb. 2, 2024

(87) PCT Pub. No.: WO2023/012164
PCT Pub. Date: Feb. 9, 2023

(65) Prior Publication Data
US 2024/0276206 A1    Aug. 15, 2024

(30) Foreign Application Priority Data
Aug. 3, 2021    (EP) .................................... 21189476

(51) Int. Cl.
*H04W 8/22*    (2009.01)
(52) U.S. Cl.
CPC .................................... *H04W 8/22* (2013.01)
(58) Field of Classification Search
None
See application file for complete search history.

(56) References Cited

U.S. PATENT DOCUMENTS 10,757,716 B2    8/2020    Starsinic et al.
2019/0124671 A1*    4/2019    Starsinic ................. H04W 4/50
(Continued)

FOREIGN PATENT DOCUMENTS

| CN | 110178350 A | | 8/2019 | |
|---|---|---|---|---|
| CN | 112544055 A | | 3/2021 | |
| CN | 112913205 A | * | 6/2021 | ......... H04L 63/0428 |

OTHER PUBLICATIONS

S6-200093_3GPP TSG-SA WG6 Meeting No. 35_Hyderabad_India_Jan. 13-17, 2020 (Year: 2020).*

(Continued)

*Primary Examiner* — Jinsong Hu
*Assistant Examiner* — Alexander J Yi
(74) *Attorney, Agent, or Firm* — Leydig, Voit & Mayer, Ltd.

(57) ABSTRACT

A method for operating or for modifying the operation of a user equipment within or as part of a telecommunications network includes: in a first step, the user equipment receives a request message, the request message being related to a specific service endpoint, and wherein the request message relates to or uses a specific application programming interface functionality provided by the specific service endpoint; in a second step, the specific service endpoint processes the received request message according to its content; and in a third step, preceding the first step, pieces of endpoint-related information regarding an application programming interface functionality of the specific service endpoint and/or regarding the address information related to the specific service endpoint are provided to a user equipment service endpoint registry functionality and are thereby exposed to be used by other nodes or instances of the telecommunications network.

9 Claims, 5 Drawing Sheets

(56) References Cited

U.S. PATENT DOCUMENTS

2019/0386991 A1 12/2019 Bischinger
2019/0394279 A1 12/2019 Dao et al.
2021/0168643 A1 6/2021 Yao et al.

OTHER PUBLICATIONS

S6-210814_3GPP Tsg-Sa WG6 Meeting No. 42-BIS-e meeting_ Apr. 12-20, 2021 (Year: 2021).*
Samsung: "UE location reporting API", 3GPP Draft; S6-200093, 3rd Generation Partnership Project (3GPP), Mobile Competence Centre; Jan. 6, 2020 (Jan. 6, 2020), pp. 1-8, vol. SA WG6, 650, Route Des Lucioles; F-06921 Sophia-Antipolis Cedex; France, No. Hyderabad, India; Jan. 13, 2020-Jan. 17, 2020, XP051841647, Retrieved from the Internet: URL:https://ftp.3gpp.org/tsg_sa/WG6_MissionCritical/TSGS6_035_Hyderabad/Docs/S6-200093.zip_S6-200093_UE_location_reportingAPI.doc [retrieved on Jan. 6, 2020].

* cited by examiner

OPERATION OF A USER EQUIPMENT WITHIN OR AS PART OF A TELECOMMUNICATIONS NETWORK USING A CONTROL PLANE FUNCTIONALITY

CROSS-REFERENCE TO PRIOR APPLICATIONS

This application is a U.S. National Phase application under 35 U.S.C. § 371 of International Application No. PCT/EP2022/071705, filed on Aug. 2, 2022, and claims benefit to European Patent Application No. EP 21189476.1, filed on Aug. 3, 2021. The International Application was published in English on Feb. 9, 2023 as WO 2023/012164 A1 under PCT Article 21(2).

FIELD

The present invention relates to a method for operating or for modifying the operation of a user equipment within or as part of a telecommunications network, wherein the operation or the modification of the operation of the user equipment is conducted using a control plane functionality, wherein the user equipment comprises or provides at least one functional and addressable service endpoint for providing or exposing a service or a functionality to a requesting entity or a requesting network node external to the user equipment, wherein the requesting entity or the requesting network node is part of the access network or of the core network.

Furthermore, the present invention relates to a user equipment for being operated or for applying a modified mode of operation within or as part of a telecommunications network, wherein the operation or the modification of the operation of the user equipment is conducted using a control plane functionality, wherein the user equipment comprises or provides at least one functional and addressable service endpoint for providing or exposing a service or a functionality to a requesting entity or a requesting network node external to the user equipment, wherein the requesting entity or the requesting network node is part of the access network or of the core network.

Additionally, the present invention relates to a system or telecommunications network for operating or for modifying the operation of a user equipment within or as part of the telecommunications network, wherein the operation or the modification of the operation of the user equipment is conducted using a control plane functionality, wherein the user equipment comprises or provides at least one functional and addressable service endpoint for providing or exposing a service or a functionality to a requesting entity or a requesting network node external to the user equipment, wherein the requesting entity or the requesting network node is part of the access network or of the core network.

Furthermore, the present invention relates to a program and to a computer-readable medium for operating or for modifying the operation of a user equipment within or as part of a telecommunications network according to a method according to the invention.

BACKGROUND

In conventionally known telecommunications networks, the functionality and/or the current or future mode of operation of a user equipment (within or as part of the telecommunications network) is typically accessible via the so-called control plane, i.e. via using control plane functionalities or mechanisms—and, especially, control plane network elements of the telecommunications network exchanging messages with related parts of the user equipment according to control plane protocol stacks—, the user equipment, and especially its functional parts, elements or modules, are able to be configured in order to realize a certain behavior or in order to be operated in a certain manner. The functionality of a user equipment (i.e. how the user equipment is operated or configured or how its mode of operation is able to be modified) might conventionally also be accessible via the so-called user plane (i.e. not the control plane), however, this is basically realized "over the top", OTT and not by using the control plane. To use control plane functionalities or mechanisms for configuring (or modifying the configuration of) a user equipment, core network entities (i.e. network elements of the core network of the telecommunications network) know that messages destined for the user equipment need to be sent via a control plane element. e.g. an access and mobility management function, e.g. in a 5G network (as part of the core network). The access and mobility management function responsible for a given connected user equipment can be found by querying the unified data management (corresponding to the home subscriber server in 4G), as the access and mobility management function responsible for each registered user equipment is registered there as part of the user equipment network registration procedure. For example, the following messages or types of messages are tunneled by the access and mobility management function via non-access stratum mechanisms or messages: user equipment—session management function, user equipment—policy and charging function, user equipment—unified data management, e.g. user equipment parameter update, UPU. Conventionally, each message container is univocally identified by a non-access stratum message type, which indicates to the user equipment at the receiving end what functionality/code/function is responsible for decoding the message. Thus, there is conventionally a 1:1 fixed relationship between the non-access stratum message type and the message destination, with typically no possibility of having several instances of the same destination type (e.g. explicit support for addressing/operating on multiple credential storage devices or application programming interfaces for steering the UE behavior).

Additionally, in conventional telecommunications networks, the manner how user equipment parameters are accessed and/or modified (i.e. how the user equipment is configured or its operation modified) is variable-based, i.e. certain variables can be read/written by the home public land mobile network, HPLMN, (of the user equipment) and/or a visited public land mobile network, VPLMN, i.e. a parameter read/write request (of a known parameter) is transmitted, by the access and mobility management function, via the gNB (or base station entity of the user equipment) to the considered user equipment, and a read/write operation result transmitted back by the user equipment. Hence, the manner how user equipment parameters are accessed and/or modified is rather static (based on 3GPP specification, which includes parameter lists and a classification of parameters in HPLMN and/or VPLMN parameters).

SUMMARY

In an exemplary embodiment, the present invention provides a method for operating or for modifying the operation of a user equipment within or as part of a telecommunications network. The operation or the modification of the operation of the user equipment is conducted using a control plane functionality. The telecommunications network comprises or is associated or assigned to an access network and to a core network. The core network provides the user equipment with data connectivity towards a data network. The telecommunications network comprises a user equipment service endpoint registry functionality. The user equipment comprises or provides at least one functional and addressable service endpoint for providing or exposing a service or a functionality to a requesting entity or a requesting network node external to the user equipment. The requesting entity or the requesting network node is part of the access network or of the core network. The service endpoint is related or corresponds to a control plane functionality. The service endpoint, as a control plane functionality or related therewith, communicates with or is accessible to a control plane network element of the telecommunications network, via a control plane channel. In order to operate or to modify the operation of the user equipment and in view of providing, by a specific service endpoint of the user equipment, a specific service or a specific functionality to the requesting entity or the requesting network node, the method comprising the following steps: in a first step, the user equipment receives, from the requesting entity or the requesting network node or on behalf of the requesting entity or the requesting network node, a request message, the request message being related to the specific service endpoint, and wherein the request message relates to or uses a specific application programming interface functionality provided by the specific service endpoint, wherein a content of the request message corresponds to an application programming interface call message intended to be received and processed by the specific service endpoint, and/or relates to or comprises a specific address information related to the specific service endpoint, wherein the content of the request message comprises means to univocally address the specific service endpoint; in a second step, the specific service endpoint processes the received request message according to its content; and in a third step, preceding the first step, pieces of endpoint-related information regarding the application programming interface functionality of the specific service endpoint and/or regarding the address information related to the specific service endpoint are provided to the user equipment service endpoint registry functionality and are thereby exposed to be used by other nodes or instances of the telecommunications network and wherein the pieces of endpoint-related information enable the user equipment service endpoint registry functionality to at least one out of the following: to register the specific application programming interface provided by the specific service endpoint, to provide address information how the specific service endpoint is accessible.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
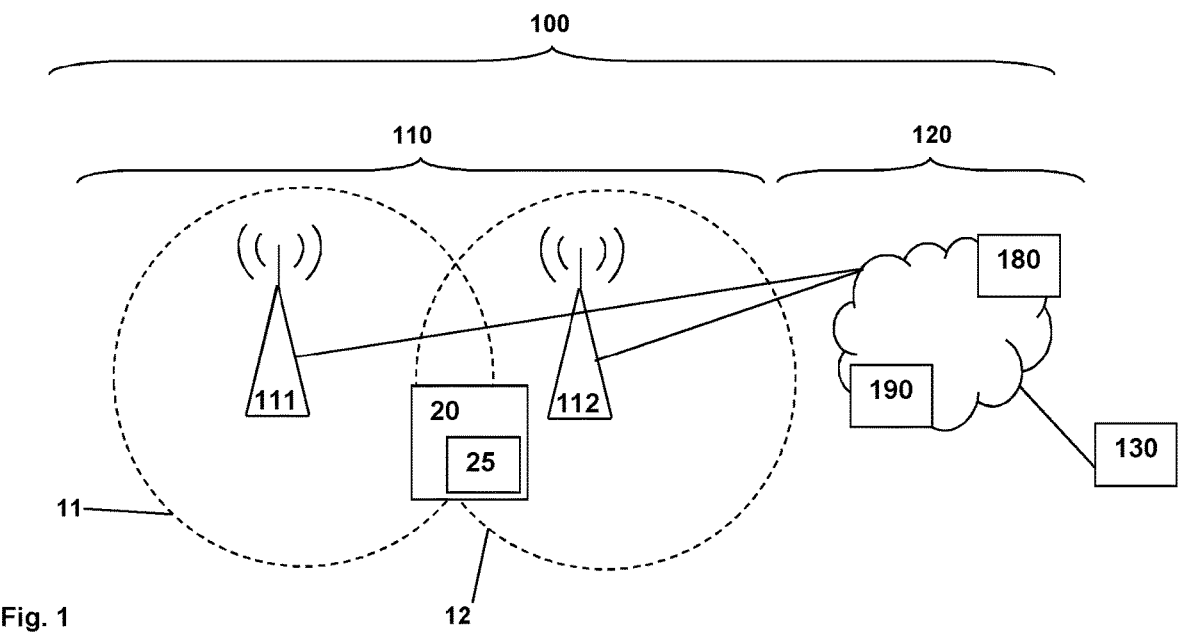
FIG. 1 schematically illustrates a telecommunications network comprising an access network, a core network and a user equipment, wherein the user equipment comprises or provides at least one functional and addressable service endpoint for providing or exposing a service or a functionality to a requesting entity or a requesting network node external to the user equipment.

Exemplary embodiments of the present invention provide a technically simple, effective and cost effective solution for operating or for modifying the operation of a user equipment within or as part of a telecommunications network, wherein the operation or the modification of the operation of the user equipment is conducted using a control plane functionality. Exemplary embodiments of the present invention further provide a corresponding user equipment, system or mobile communication network, user equipment service endpoint registry functionality, and a corresponding program and computer-readable medium.

Exemplary embodiments of the present invention provide a method for operating or for modifying the operation of a user equipment within or as part of a telecommunications network, wherein the operation or the modification of the operation of the user equipment is conducted using a control plane functionality, wherein the telecommunications network comprises or is associated or assigned to an access network and to a core network, wherein the core network provides the user equipment with data connectivity towards a data network (e.g. the Internet), wherein the user equipment comprises or provides at least one functional and addressable service endpoint for providing or exposing a service or a functionality to a requesting entity or a requesting network node external to the user equipment, wherein the requesting entity or the requesting network node is part of the access network or of the core network, wherein the service endpoint is related or corresponds to a control plane functionality, and wherein the service endpoint, as a control plane functionality or related therewith, communicates with or is accessible to a control plane network element of the telecommunications network, via a control plane channel, wherein, in order to operate or to modify the operation of the user equipment and in view of providing, by a specific service endpoint of the user equipment, a specific service or a specific functionality to the requesting entity or the requesting network node, the method comprises the following steps:

in a first step, the user equipment receives, from the requesting entity or the requesting network node or on behalf of the requesting entity or the requesting network node, a request message, the request message being related to the specific service endpoint, and wherein the request message relates to or uses a specific application programming interface functionality provided by the specific service endpoint and/or relates to or comprises a specific address information related to the specific service endpoint, in a second step, the specific service endpoint processes the received request message according to its content.

It is thereby advantageously possible according to the present invention to configure a user equipment (i.e. to operate a user equipment according to a certain manner) and/or to modify the operation of that user equipment in a much more flexible manner than conventionally known. Furthermore, it is advantageously possible to apply the principle of the present invention to situations of the user equipments having a more complex structure or functionality, especially comprising or providing a plurality of different service endpoints for providing or exposing a service or a functionality of the same kind. Alternatively or cumulatively, it is furthermore advantageously possible according to the present invention that such service endpoints are accessible in a more flexible manner than just variable-based.

According to the present invention, the operation (or the mode of operation) of a user equipment (within or as part of a telecommunications network) shall be defined and/or influenced and/or modified in a comparatively easy, flexible, future-proof (or modification-proof) manner. According to the present invention, the operation (or the mode of operation) is defined (or the modification of the operation of the user equipment is conducted) using a control plane functionality, i.e. especially not a user plane functionality (and especially not a user plane functionality alone, i.e. without any involvement of the control plane).

The telecommunications network typically comprises an access network and a core network. However, the present invention is also related to situations where the telecommunications network does not comprise, strictly speaking, both an access network and a core network, but where the telecommunications network is only associated or assigned to an access network (and especially comprises the core network), or where the telecommunications network is only associated or assigned to a core network (and especially comprise the access network), or where the telecommunications network is only associated or assigned to both an access network and a core network. According to the present invention, the core network especially provides the user equipment with data connectivity towards a data network.

According to the present invention, the user equipment comprises or provides at least one functional and addressable service endpoint for providing or exposing a service or a functionality to a requesting entity or a requesting network node external to the user equipment, the requesting entity or the requesting network node being part of the access network or of the core network. Typically according to the present invention, the user equipment comprises a plurality of functional and addressable service endpoint for providing or exposing a service or a functionality to a requesting entity or a requesting network node external to the user equipment; especially any functional or logical part, module or entity within or associated with the user equipment, such as, e.g., one or multiple subscriber identity modules, subscriptions or parameters/configurations that are able to be defined and/or modified.

According to the present invention, the service endpoint is related or corresponds to a control plane functionality, and the service endpoint—as a control plane functionality or related therewith—communicates with or is accessible to a control plane network element (or to a plurality of control plane network elements) of the telecommunications network, via a control plane channel. Especially the control plane element corresponds to an access and mobility management function of the core network, and the control plane channel corresponds to an interface between the user equipment and the control plane element, i.e. a signaling channel. This is in contrast, according to the present invention, to using a user plane functionality, e.g. between a user equipment application and a data network.

According to an embodiment of the present invention, the method comprises (in order to operate or to modify the operation of the user equipment and in view of providing, by a specific service endpoint of the user equipment, a specific service or a specific functionality to the requesting entity or the requesting network node):

in the first step, the user equipment receiving, from the requesting entity or the requesting network node or on behalf of the requesting entity or the requesting network node, the request message, the request message being related to the specific service endpoint, and the request message relating to or using a specific application programming interface functionality provided by the specific service endpoint, and in the second step, the specific service endpoint processing the received request message according to its content, i.e. the content of the request message especially corresponding to an application programming interface call directed or intended to be received (and processed) by the specific service endpoint.

According to a further embodiment of the present invention, the method comprises (in order to operate or to modify the operation of the user equipment and in view of providing, by a specific service endpoint of the user equipment, a specific service or a specific functionality to the requesting entity or the requesting network node):

in the first step, the user equipment receiving, from the requesting entity or the requesting network node or on behalf of the requesting entity or the requesting network node, the request message, the request message being related to the specific service endpoint, and the request message relating to or comprising a specific address information related to the specific service endpoint, and in the second step, the specific service endpoint processing the received request message according to its content, i.e. the content of the request message especially comprising the specific address information via which it is possible to specifically address the specific service endpoint, even in case that the specific service endpoint is one of a plurality of service endpoints that are of the same kind or nature, such as different instances of the same service or functionality.

According to still a further embodiment of the present invention, the method comprises (in order to operate or to modify the operation of the user equipment and in view of providing, by a specific service endpoint of the user equipment, a specific service or a specific functionality to the requesting entity or the requesting network node):

in the first step, the user equipment receiving, from the requesting entity or the requesting network node or on behalf of the requesting entity or the requesting network node, the request message, the request message being related to the specific service endpoint, and the request message relating to (or using or comprising) both a specific application programming interface functionality provided by the specific service endpoint, and a specific address information related to the specific service endpoint, and in the second step, the specific service endpoint processing the received request message according to its content, i.e. the content of the request message especially both corresponding to an application programming interface call directed or intended to be received (and processed) by the specific service endpoint, and comprising the specific address information via which it is possible to specifically address the specific service endpoint.

Especially in case that the request message relates to or uses a specific application programming interface functionality provided by the specific service endpoint, the following advantages are possible to be realized:

It is advantageously possible to realize a modular functional representation of the user equipment as a service producer with exposed application programming interfaces that are able to be addressed by (entities or network elements of) the core network and/or by (entities or network elements of) the radio access network and/or by (entities or network elements of) a third party (e.g. hyperscaler, application provider, enterprise) to interact with certain user equipments and use their exposed functionality (in 3GPP terminology, the entity calling an application programming interface is called the consumer (it consumer the results) and the entity exposing the functionality via the application programming interface (i.e. in the context of the present invention: the user equipment) is the producer; for realizing notifications, the corresponding messages are transmitted from the user equipment to the consumer).

It is advantageously possible to provide for an exposure of application programming interface endpoints to the radio resource control and/or to the non-access stratum layer and/or, via a network exposure function, to third party entity.

Especially, it is advantageously possible to realize cross-layer access to the (application programming interface) functionality of the service endpoints of (or within or as part of) the user equipment (e.g. the same application programming interface is able to be exposed at the radio resource control layer and the non-access stratum layer).

Furthermore, a flexible authorization is advantageously possible (i.e. a flexible delegated service-based authorization model) of certain application programming interfaces depending on the trust level, e.g. a visited public land mobile network might be able to operate on certain user equipment application programming interfaces (e.g. only read, only change certain parameters) while a home public land mobile network might be able to have broader access. This also enables that multiple instances of a given application programming interface (or multiple instances of a given (kind of) service endpoint), e.g. applicable to different subscriptions, are able to be made accessible for each subscription owner (e.g. PLMN) if, e.g. there is an agreement between them.

Especially, it is advantageously possible according to the present invention, especially in case that the request message relates to or uses a specific application programming interface functionality provided by the specific service endpoint, that one or more of the following already existing functionalities (regarding especially the definition and/or the modification of parameters) are operated via application programming interfaces (provided by the service endpoints in the user equipment) instead of the current model of read or read/write of (parameter) variables, especially based on non-access stratum messages: IP multimedia subsystem (IMS) managed objects (MOs), user equipment route selection policies (URSPs), allowing to steer traffic routing within the user equipment to specific targets), parameters stored in the universal subscriber identity module (USIM) as well as in the mobile equipment (ME) (e.g. some parameters used in standalone non-public networks (SNPNs) do not require a SIM card; a specific example is, e.g., SNPN credentials), procedures supported by the mobile equipment (ME), over-the-air (OTA) procedures such as device update According to the present invention, it is additionally advantageous that a user equipment is able to use service base infrastructure (e.g. instead of non-access stratum messages) to communicate with the core network, especially a 5G core, and/or with functional entities.

Especially in case that the request message relates to or comprises a specific address information related to the specific service endpoint, the following advantages are possible to be realized:

It is advantageously possible to provide for a possibility to modularly separate the user equipment in different parameters and/or local devices (e.g. SIM card), functional entities, or service endpoints (especially providing service accessible via different application programming interfaces), and nevertheless be able to address each one (and especially each instance) separately via dynamically locate their destinations (i.e. the destination of each instance for example); in conventionally known telecommunications networks, it is currently not possible to dynamically locate the destination of a tunneled message.

It is furthermore advantageously possible to add new user equipment functionality without requiring changes in the non-access stratum protocol and/or other protocol changes; this thus enables the possibility of defining a "baseline" containing basically no functionality and dynamically add on top further functionalities without backwards-compatibility issues.

Especially, it is advantageously possible to use such addressing to enable API-based exposure of user equipment services, i.e. in case that—additionally to the request message relating to or comprising a specific address information related to the specific service endpoint—the request message also relates to or uses a specific application programming interface functionality provided by the specific service endpoint.

Furthermore, it is advantageously possible to add non-API (service) endpoints within the user equipment, such as, e.g., SIM devices, variables within the user equipment device or the like.

Additionally, it is advantageously possible to further simplify the access and mobility management function as signaling anchor such that signaling more directly flows between the actual functional entities involved (e.g. especially in case of non-3GPP access, currently everything flows via the access and mobility management function, then towards the user plane function).

Especially in case that the request message both relates to or uses a specific application programming interface functionality provided by the specific service endpoint, and relates to or comprises a specific address information related to the specific service endpoint, the following advantages are possible to be realized:

it is advantageously possible to use the addressing (i.e. the address information) to enable API-based exposure of user equipment services.

Conventionally known telecommunications networks typically comprise an access network and a core network, wherein the user equipment is connected to the access network, and the access network is connected to the core network. The user equipment is able to be connected, via the core network, to a data network. The user equipment typically communicates with the access network (or radio access network) via an interface, typically a radio interface. This is used for conveying both signaling information and data traffic, but there is typically a logical separation (logical channels) for the transport of both types of traffic. Between the access network (especially the radio access network, and especially a gNB base station entity) and the core network, signaling information and user data are separated in different interfaces, e.g. N1/N2 and N3 in case of 5G; signaling traffic or information (in the core network normally handled by the access and mobility management function) is typically transported using a SCTP/NG-AP/NAS protocol stack, and user data (in the core network normally handled by the user plane function) is typically transported using a UDP/GTPU-U protocol stack. Conventionally, there are normally (protocol-wise) different levels of signaling, each with different anchorings (e.g. NAS/N1 is between the user equipment and the core network, while RC is between the user equipment and the access network or radio access network). The different logical control plane links can be tunneled between each link, with intermediate (network) elements playing just a forwarding role. A similar approach is performed for the user plane.

In order to establish a data connection enabling a user equipment to communicate with a data network, a protocol data unit (PDU) session is required. A PDU session is a logical data transport channel terminated at the core network that provides connectivity to a data network. The termination point of a given PDU session (user plane function according to, e.g., the 5G standard) is termed PDU session anchor (PSA). While a user equipment moves (handover procedures occur between the user equipment and different gNBs or base station entities), the PDU session anchor is, normally and typically, expected to remain constant. A PDU session can have one or more an associated quality-of-service for the underlying transported data (e.g. one or more QoS flows within the PDU session).

In a conventionally known telecommunications network, it might be possible to communicate with the end application (within the user equipment, i.e. running on the user equipment) via user plane (over-the-top, OTT). However, what is aimed at according to the present invention, is accessing the user equipment itself (i.e. not, e.g., the internet protocol addresses (IPs) accessible via a PDU session created for data network connectivity of the user equipment). In such an OTT case, an application installed on the user equipment can communicate OTT with a third party (e.g. connected to or providing the data network) and then locally interact with the user equipment, e.g. via AT commands (Hayes command set or ITU V.250 standard) or similar local interfaces, typically proprietary.

Normally in conventional telecommunications networks, the manner how user equipment parameters are accessed and/or modified (i.e. how the user equipment is configured or its operation modified) is variable-based. That is, (similarly to how the simple network management protocol, SNMP, works) certain variables can be read/written by the home public land mobile network, HPLMN, (of the user equipment) and/or a visited public land mobile network, VPLMN, i.e. a parameter read/write request (of a known parameter) is transmitted, by the access and mobility management function, via the gNB (or base station entity of the user equipment) to the considered user equipment, and a read/write operation result transmitted back by the user equipment. The access rights are static (based on 3GPP specification). Conventionally, only the core network is (or network elements of the core network are) allowed to parametrize the user equipment, the reason being is that only the core network has a security context that allows for secure communication with the user equipment via or using the non-access stratum protocol. Such read/write variable access is always done via the access and mobility management function. Depending on which parameters are to be accessed, the access and mobility management function may just forward secured messages (e.g. the steering of roaming (of the user equipment) is authenticated by the unified data management). However, such messages could also ultimately come from a third party, external to the core network (of the telecommunications network), i.e. via an intermediate network function such as a network exposure function. Whichever the case, communication is always realized via the access and mobility management function, and the radio access network-user equipment communication layer (radio resource control, RRC) has no access to this information exchange.

In contrast thereto, within the core network (especially the 5G core network), network functions are accessed via application programming interface calls, with available application programming interfaces being registered on the network repository function so that they can be discovered by other network functions. Application programming interface implies that operations that can be called are defined based on an application programming interface description describing operations (e.g. add, remove, query, subscribe, notify), parameters (mandatory, optional, allowed values), expected output(s) as well as any necessary data structures so that the definition of the functionality is self-contained and machine-readable in the application programming interface definition).

Currently, only network functions can access application programming interfaces in the core network (especially the 5G core network).

According to the present invention, the user equipment itself is able to expose an application programming interface or a plurality of application programming interfaces that can be accessed by network functions or network elements of the telecommunications network. Exchange of said application programming interface-related information is performed via a control plane channel (e.g. integrating similar or analogous generic structures to that of the HTTP protocol within the non-access stratum protocol).

According to the present invention, it is advantageously possible and preferred that the telecommunications network comprises a user equipment service endpoint registry functionality, wherein, in a third step, preceding the first step, pieces of endpoint-related information
  regarding the application programming interface functionality of the specific service endpoint and/or
  regarding the address information related to the specific service endpoint, especially regarding a specific instance of the specific service endpoint,
  are provided to the user equipment service endpoint registry functionality, and especially thereby exposed to be used by other nodes or instances of the telecommunications network, wherein the pieces of endpoint-related information especially enable the user equipment service endpoint registry functionality to at least one out of the following:
  to register the specific application programming interface provided by the specific service endpoint,
  to provide address information how the specific service endpoint is accessible, especially address information regarding a specific instance of the specific service endpoint, wherein especially endpoint-related information—exposed regarding a service endpoint of the user equipment—is able to be provided, via the user equipment service endpoint registry functionality, to a plurality of requesting entities or requesting network nodes, especially to third party network functions,
  wherein especially the user equipment service endpoint registry functionality is part of the access network of the telecommunications network or part of the core network of the telecommunications network.

Via providing, by the user equipment, the user equipment service endpoint registry functionality with pieces of endpoint-related information
  regarding the application programming interface functionality of the specific service endpoint and/or
  regarding the address information related to the specific service endpoint, especially regarding a specific instance of the specific service endpoint,
  it is advantageously possible according to the present invention that, by virtue of the pieces of endpoint-related information, the application programming interface functionality of the specific service endpoint and/or the address information related to the specific service endpoint are exposed in order to be used by other nodes or instances (or network elements) of the telecommunications network.

This means according to such an embodiment of the present invention (where the telecommunications network comprises a user equipment service endpoint registry functionality and where, in the third step, pieces of endpoint-related information are provided by the user equipment) that the pieces of endpoint-related information are either related to the application programming interface functionality of the specific service endpoint, or to the address information related to the specific service endpoint, or to both the application programming interface functionality of the specific service and the address information related to the specific service endpoint. The latter possibility might also be realized, according to the present invention, in that first pieces of endpoint-related information are related to the application programming interface functionality of the specific service, and second pieces of endpoint-related information are related to the address information related to the specific service endpoint.

Especially, it is advantageously possible according to such an embodiment of the present invention (in case that the pieces of endpoint-related information are related to the application programming interface functionality of the specific service) that the user equipment is enabled to register exposed (i.e. available) application programming interfaces of the available services (i.e. the available service endpoints) into the user equipment service endpoint registry functionality serving as a register function accessible via the radio access network and/or the core network (and/or a third party network element) so that such a network element (or radio access network/core/third party components) are able to query the corresponding user equipment service endpoint (or plurality of service endpoints) matching specific parameters and communicate with them.

This also makes it advantageously possible according to the present invention (in case that the pieces of endpoint-related information are related to the application programming interface functionality of the specific service) that third party entities (e.g. application providers such as, e.g., Netflix, or hyperscalers such as, e.g., Google or Facebook, or enterprise networks) are enabled to register an application programming interface endpoint in the telecommunications network so that other network components can find it and interact with it.

Furthermore, it is also advantageously possible according to the present invention (in case that the pieces of endpoint-related information are related to the application programming interface functionality of the specific service) that third parties (e.g. via a network exposure function) are enabled to access user equipment-exposed application programming interfaces based on specific parameters (e.g. only user equipments supporting a "Netflix application programming interface").

Furthermore, it is advantageously possible according to the present invention (in case that the pieces of endpoint-related information are related to the application programming interface functionality of the specific service), to allow for the realization or creation of a relationship—within the telecommunications network—between, on the one hand, what a subscription is allowed to do (knowledge about what a subscription is allowed to do is typically already available in conventionally known telecommunications networks), and, on the other hand, what a user equipment can do (or is able to do); this latter knowledge being, in conventionally known telecommunications networks, either not available or at least not completely available; in essence, such a relationship—within the telecommunications network—between what a subscription is allowed to do, and what a user equipment can do, especially allows for the realization of a flexible delegated service-based authorization model.

The exposure of the application programming interface—via using the user equipment service endpoint registry functionality and corresponding pieces of endpoint-related information—also provides the possibility of an easier definition for device classes and exposure of device capabilities: Instead of the set of explicit device classes (currently used in conventionally known telecommunications networks), according to the present invention, a device is able to be defined by the set of services and service information it registers in the network (i.e. to the user equipment service endpoint registry functionality) as being supported.

Additional Advantages Include the Following:

- It is possible to allow for a much more simplified user equipment registration procedure, as a network attach can be reduced to a minimum and then service registration can be separated (could even be performed separately via a PDU session)
- Registration of a single subscriber over multiple devices where it is clear for the network what each device supports (e.g. one user equipment may support IP multimedia subsystem, the other not) and thus page only relevant user equipments; in short: Allow an explicit 1:N relationship between "registered subscriber" and "registered user equipment".
- Modular addition of new services without the need of extending the N1 interface (currently every information element usable needs to be defined in the non-access stratum protocol specification explicitly), e.g. a "Netflix API".
- Application/enables (IMS, Facebook, Google, etc.), user equipment capabilities (voice, data, operation system, downloads, internet-of-things/machine type communication capabilities).
- Interaction with third parties via user equipment-exposed application programming interfaces (e.g. via an intermediate element like a network exposure function) so that third parties can operate on and/or be notified when certain triggers are set (e.g. certain behaviors for user equipment functionality).
- Search for/interact with/steer user equipments supporting specific services.
- Be notified when user equipments supporting certain capabilities are active in the telecommunications network.
- Instead of the currently-used method of capability negotiation, typically a binary mask indicating what features (0/1) are supported, user equipments would be able to explicitly state what specific services are supported. This offers a much easily extendable method of adding functionality that is backwards-compatible (at some points bits in a specified bitmask are full).
- Additionally, to adding application programming interfaces, application programming interfaces can also be versioned in an explicit way, so given services can be up-versioned without impacting the definition of other services.
- Service-based signaling is able to be used, according to the present invention in a situation where the user equipment is a service producer: Hence the user equipment is able to use directly service based infrastructure instead of non-access stratum to communicate with the, e.g. 5G, core functional entities and also expose capabilities, procedures and settings to third parties.

According to the present invention, it is furthermore advantageously possible and preferred that the transmission of pieces of endpoint-related information, especially regarding the specific application programming interface functionality of the specific service endpoint is part of the network registration procedure of the user equipment with the telecommunications network.

It is thereby advantageously possible according to the present invention to integrate the transmission of the pieces of endpoint-related information, especially regarding the specific application programming interface functionality of the specific service endpoint with the registration procedure.

According to the present invention, it is furthermore advantageously possible and preferred that a control plane channel acts as transport channel for a user plane channel via encapsulation or vice-versa, especially for the transmission of the request message and/or for the transmission of the pieces of endpoint-related information.

Furthermore, it is advantageously possible and preferred according to the present invention that the request message corresponds to at least one out of the following:

- a non-access stratum message, especially a non-access stratum message comprising a container, especially a UE parameter update container,
- a non-access stratum message, especially a non-access stratum message comprising a container, especially a UE parameter update container, sent encapsulated over a specific PDU session, especially a Wifi PDU session,
- a radio resource control message.

Thereby, it is advantageously possible to use established mechanisms to realize a method according to the present invention.

Furthermore, it is advantageously possible and preferred according to the present invention that the requesting entity or requesting network node corresponds to at least one out of the following components within a 5G system or IP multimedia subsystem, IMS system:

- gNB or base station entity,
- access and mobility management function, AMF, session management function, SMF, user plane function, UPF, unified data management, UDM, policy and charging function, PCF, short message service function, SMSF, non-3GPP interworking function, N3IWF, charging function, CHF, network exchange function, NEF, network data analytics function, NWDAF, network repository function, NRF, gateway mobile location center, GMLC,
- serving call state control function, S-CSCF, proxy call state control function, P-CSCF, interrogating call state control function, I-CSCF.

According to a further preferred embodiment of the present invention, the specific service endpoints and/or the specific application programming interface functionality provided by the specific service endpoint within the user equipment, expose one or more of the following functionalities within a mobile communications system:

- mobility management, session management, short message service, user equipment policy, location services, USIM,
- IP multimedia subsystem managed object, IMS MO.

Thereby, it is advantageously possible that the user equipment is able to be easily and efficiently configured and/or its mode of operation modified.

According to a further preferred embodiment of the present invention, the user equipment exposes at least two specific service endpoints and/or specific application programming interface functionalities of the same type, or exposes at least two instances of the specific service endpoint or specific application programming interface functionality, especially at least two USIM service endpoints and/or specific application programming interface functionalities.

It is thereby advantageously possible to efficiently distinguish between such different functionalities and/or instances of the same type within the user equipment, and it is advantageously possible—especially via the corresponding request message and/or the corresponding pieces of endpoint-related information relating to or comprising a specific address information related to the specific service endpoint—to selectively address or target such different functionalities of the same type individually or such different instance of the specific service endpoint individually.

According to a further preferred embodiment of the present invention, the pieces of endpoint-related information regarding the application programming interface functionality of the specific service endpoint define an application programming interface that the specific service endpoint is able to provide to a plurality of requesting entities or requesting network nodes, especially to third party network functions,
   wherein especially the request message relating to or using the specific application programming interface functionality provided by the specific service endpoint corresponds to an application programming interface call message, and
   wherein especially the user equipment service endpoint registry functionality corresponds to a user equipment application programming interface registry functionality, especially located at the access network level and/or at the core network level of the telecommunications network.

Thereby, it is especially advantageously possible that the user equipment service endpoint registry functionality is able to be located at the access network level and/or at the core network level of the telecommunications network.

Furthermore, it is advantageously possible and preferred according to the present invention that the pieces of endpoint-related information regarding the address information related to the specific service endpoint comprise a way to univocally address the specific service endpoint, wherein the specific service endpoints especially corresponds to a functionality of the user equipment and/or to a variable of the user equipment and/or a device or module of the user equipment,
   wherein especially the user equipment service endpoint registry functionality corresponds to a user equipment endpoint registry functionality, especially located at the core network level of the telecommunications network.

Furthermore, the present invention relates to a user equipment for being operated or for applying a modified mode of operation within or as part of a telecommunications network, wherein the operation or the modification of the operation of the user equipment is conducted using a control plane functionality,
   wherein the telecommunications network comprises or is associated or assigned to an access network and to a core network, wherein the core network provides the user equipment with data connectivity towards a data network,
   wherein the user equipment comprises or provides at least one functional and addressable service endpoint for providing or exposing a service or a functionality to a requesting entity or a requesting network node external to the user equipment, wherein the requesting entity or the requesting network node is part of the access network or of the core network,
   wherein the service endpoint is related or corresponds to a control plane functionality, and wherein the service endpoint, as a control plane functionality or related therewith, communicates with or is accessible to a control plane network element of the telecommunications network, via a control plane channel,
   wherein, in order for the user equipment to be operated or for applying a modified mode of operation and in view of providing, by a specific service endpoint of the user equipment, a specific service or a specific functionality to the requesting entity or the requesting network node, the user equipment is configured such that:
      the user equipment receives, from the requesting entity or the requesting network node or on behalf of the requesting entity or the requesting network node, a request message, the request message being related to the specific service endpoint, and wherein the request message
      relates to or uses a specific application programming interface functionality provided by the specific service endpoint and/or
      relates to or comprises a specific address information related to the specific service endpoint,
      the specific service endpoint processes the received request message according to its content.

Furthermore, the present invention relates to a system or telecommunications network for operating or for modifying the operation of a user equipment within or as part of the telecommunications network, wherein the operation or the modification of the operation of the user equipment is conducted using a control plane functionality,
   wherein the telecommunications network comprises or is associated or assigned to an access network and to a core network, wherein the core network provides the user equipment with data connectivity towards a data network,
   wherein the user equipment comprises or provides at least one functional and addressable service endpoint for providing or exposing a service or a functionality to a requesting entity or a requesting network node external to the user equipment, wherein the requesting entity or the requesting network node is part of the access network or of the core network,
   wherein the service endpoint is related or corresponds to a control plane functionality, and wherein the service endpoint, as a control plane functionality or related therewith, communicates with or is accessible to a control plane network element of the telecommunications network, via a control plane channel,
   wherein, in order to operate or to modify the operation of the user equipment and in view of providing, by a specific service endpoint of the user equipment, a specific service or a specific functionality to the requesting entity or the requesting network node, the system or telecommunications network is configured such that:
      the telecommunications network or the requesting entity or the requesting network node or on behalf of the requesting entity or the requesting network node transmits, to the user equipment, a request message, the request message being related to the specific service endpoint, wherein the request message
      relates to or uses a specific application programming interface functionality provided by the specific service endpoint and/or relates to or comprises a specific address information related to the specific service endpoint, the specific service endpoint processes the received request message according to its content.

Regarding the system or telecommunications network, it is especially preferred that it comprises a user equipment service endpoint registry functionality, wherein pieces of endpoint-related information regarding the application programming interface functionality of the specific service endpoint and/or regarding the address information related to the specific service endpoint, especially regarding a specific instance of the specific service endpoint, are provided to the user equipment service endpoint registry functionality, and are especially thereby exposed to be used by other nodes or instances of the telecommunications network.

Still additionally, the present invention relates to user equipment service endpoint registry functionality of a system or a telecommunications network according to the present invention.

Additionally, the present invention relates to a program comprising a computer readable program code and/or a computer-readable medium comprising instructions, which, when executed on a computer and/or on a user equipment and/or on a user equipment service endpoint registry functionality and/or on a network node of a telecommunications network, or in part on a user equipment and/or in part on user equipment service endpoint registry functionality and/or in part on a network node of a telecommunications network, causes the computer and/or the user equipment and/or the user equipment service endpoint registry functionality and/or the network node of the telecommunications network to perform a method according to the invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 100 comprising an access network 110, and a core network 120 is schematically shown. The access network 110 comprises a plurality of radio cells 11, 12. In the exemplary situation or scenario shown in FIG. 1, a first base station entity 111 generates or is associated with or spans the first radio cell 11, and a second base station entity 112 generates or is associated with or spans the second radio cell 12. A user equipment 20 comprises or provides at least one functional and addressable service endpoint 25 for providing or exposing a service or a functionality to a requesting entity or a requesting network node 190 external to the user equipment 20. Especially, the requesting entity or the requesting network node 190 is part of the access network 110 or of the core network 120. The user equipment 20 is typically, but not necessarily, mobile i.e. able to move with respect to the (typically, but not necessarily static) radio cells 11, 12 or corresponding base station entities 111, 112 of the access network 110. In the exemplarily represented illustration of FIG. 1, the core network 120 comprises a user equipment service endpoint registry functionality 190. Furthermore, the core network 120 is connected to a data network 130. The core network 120 provides the user equipment 20 with data connectivity towards the data network 130.

According to the present invention, the user equipment 20 is operated or configured or its operation or mode of operation modified using a control plane functionality of the telecommunications network 100.

Figure 2:
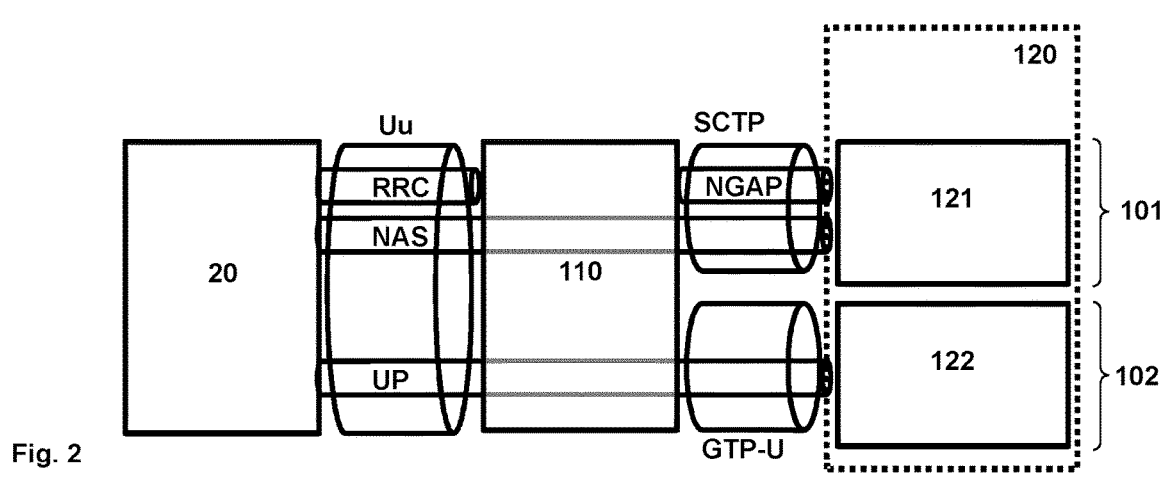
FIG. 2 schematically illustrates the separation of the control plane and the user plane in the communication between the user equipment, the radio access network, and the core network of the telecommunications network.

In FIG. 2, the separation of the control plane 101 and the user plane 102 in the communication between the user equipment 20, the access network 110 (or radio access network 110), and the core network 120 of the telecommunications network 100 is schematically shown. As in conventionally known telecommunications networks, the telecommunications network 100 comprises different levels of signaling, each with different anchoring (non-access stratum/N1 interface between the user equipment 20 and the core network 120, and radio resource control between the user equipment 20 and the radio access network 110 (or access network 110). An access and mobility management function 121 serves as control plane anchor and a user plane function 122 serves as user plane anchor. As interfaces between the core network 120 and the access network 110, the SCTP is used for the control plane 101, and the GTP-U is used for the user plane 102.

According to the present invention, the user equipment 20 comprises or provides at least one functional and addressable service endpoint 25 for providing or exposing a service or a functionality to a requesting entity or a requesting network node 190 external to the user equipment 20, wherein the requesting entity or the requesting network node 190 is part of the access network 110 or of the core network 120.

The service endpoint 25 is related or corresponds to a control plane functionality, and the service endpoint 25, as a control plane functionality or related therewith, communicates with or is accessible to a control plane network element 121 of the telecommunications network 100, via a control plane channel.

In order to operate or to modify the operation of the user equipment 20 and in view of providing, by a specific service endpoint 25 of the user equipment 20, a specific service or a specific functionality to the requesting entity or the requesting network node 190, the user equipment 20 receives, from the requesting entity or the requesting network node 190 or on behalf of the requesting entity or the requesting network node 190, a request message 250, the request message 250 being related to the specific service endpoint 25, and the request message 250 relates to or uses a specific application programming interface functionality provided by the specific service endpoint 25 and/or relates to or comprises a specific address information related to the specific service endpoint 25.

Subsequently, the specific service endpoint 25 processes the received request message 250 according to its content.

Hence, according to the present invention, the request message 250 either relates to or uses a specific application programming interface functionality provided by the specific service endpoint 25, or the request message 250 relates to or comprises a specific address information related to the specific service endpoint 25, or the request message 250 both relates to or uses a specific application programming interface functionality provided by the specific service endpoint 25 and relates to or comprises a specific address information related to the specific service endpoint 25.

Figure 6:
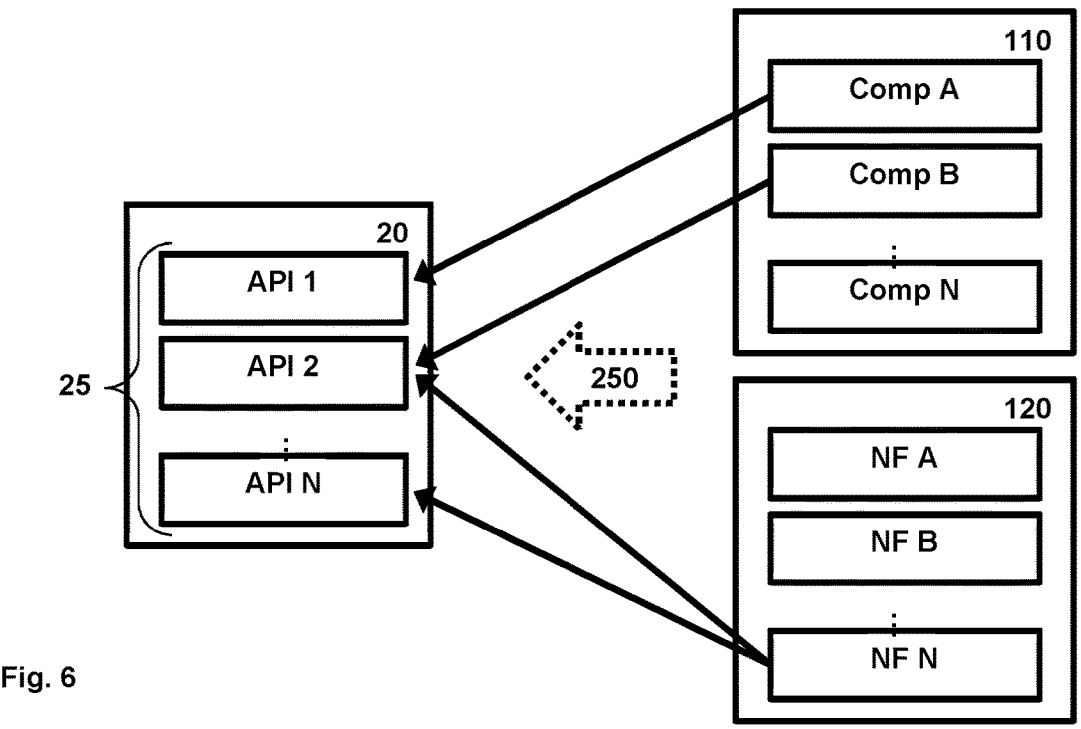
FIG. 6 schematically illustrates a communication between the user equipment, and the radio access network and/or the core network of the telecommunications network according to the present invention.

For the case of the request message 250 relating to or using a specific application programming interface functionality provided by the specific service endpoint 25, this is schematically represented in FIG. 6 which schematically illustrates a communication between the user equipment 20 and a network function or network element of the radio access network 110 and/or the core network 120 of the telecommunications network 100 according to the present invention as well as the application programming interface exposure of the user equipment 20. The user equipment 20 comprises a plurality of different service endpoints 25, indicated via reference signs API 1, API 2, . . . , API N. According to the present invention, the capabilities of the user equipment 20 (i.e. the respective specific service endpoints 25) are defined by the application programming interfaces the user equipment 20 exposes. Components of the access network 110 (or radio access network 110), indicated in FIG. 6 via reference signs Comp A, Comp B, . . . , Comp N, and/or network functions of the core network 120, indicated in FIG. 6 via reference signs NF A, NF B, . . . , NF N (corresponding to the requesting entity or the requesting network node 190, respectively) are able to send a signaling message (request message 250) to the user equipment 20 relating to or using one of the specific application programming interface functionalities provided by the service endpoints 25 of the user equipment 20.

Figure 3:
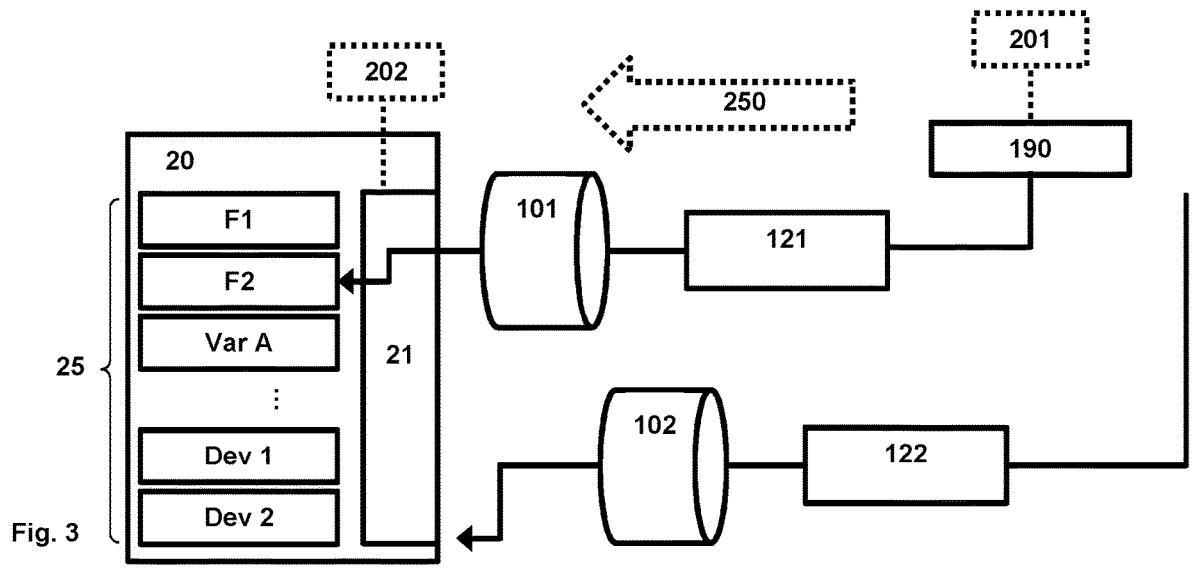
FIG. 3 schematically illustrates a communication between the user equipment and a network function using a control plane communication mechanism.

For the case of the request message 250 relating to or comprising a specific address information related to the specific service endpoint 25, this is schematically represented in FIG. 3 which schematically illustrates a communication between the user equipment 20 and a network function 190 (corresponding to the requesting entity or the requesting network node 190) using a control plane communication mechanism: The user equipment 20 comprises a plurality of different service endpoints 25, indicated via reference signs F1, F2 (Functionality A1, A2), Var A (Variable A), Dev 1, Dev 2 (Device 1, 2) in FIG. 3. A user equipment stack or user equipment protocol stack is indicated via reference sign 21. In a first processing step 201, the network function 190 (corresponding to the requesting entity or the requesting network node 190) decides whether to send signaling message (request message 250) via the control plane anchor 121 (or indirectly via the user plane anchor 122 if the control plane is encapsulated within the user plane) and includes endpoint address information—i.e. the specific address information related to the specific service endpoint 25 of the user equipment 20—in the request message 250. Within the user equipment 20, and in processing step 202, a routing towards the destination endpoint (i.e. the respective service endpoint), addressed by the address information, i.e. based on the user equipment endpoint address in message 250, takes place.

Figure 4:
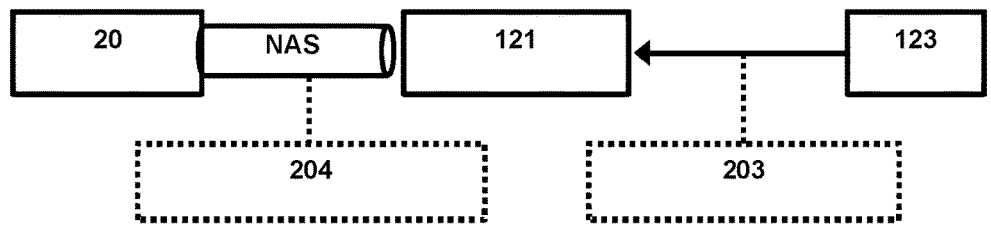
FIG. 4 schematically illustrates a communication between the user equipment, an access and mobility management function, and a unified data management in order to configure and/or to modify the operation of the user equipment according to the present invention.

This means that according to the present invention, messages (request messages 250) are sent towards the user equipment 20 that contain an endpoint address such that the user equipment stack 21 can ascertain the target of the transmitted message (i.e. the service endpoint 25 indicated by the endpoint address or address information). As opposed to the conventionally known "non-access stratum message type" (e.g. SM, MM), it also includes an instance address that allows to differentiate between different instances of the same endpoint type, e.g. a different PATH (or endpoint address) for different service endpoints 25 (such as, e.g., application programming interface service endpoints within the user equipment 20, multiple SIM cards and/or subscriber-dependent information when multiple subscriptions are present in the user equipment 20, multiple radios, e.g. 5G-NR radios, in the same user equipment 20). FIG. 4 schematically illustrates a communication between the user equipment 20, the access and mobility management function 121, and a unified data management 123 in order to configure and/or to modify the operation of a user equipment 20 according to the present invention. In a first processing step 203, a user equipment parameter update (UPU) message (container) is transmitted—as the request message 250—from the unified data management 123 to the access and mobility management function 121. In a second processing step 204, the UPU container is sent over non-access stratum, i.e. via a non-access stratum message, and the UPU container indicates an, endpoint address" (i.e. the specific address information related to the specific service endpoint 25, e.g. corresponding to a variable) indicating the destination of the UPU container.

Similarly to how IPv6 can provide the same functionality as IPv4 via using specified ranges for well-known uses, specific (i.e. standardized, well-known) addresses can be used to cover all of the use cases of "NAS message type" currently used (e.g. "currently active SIM device") while also allowing dynamic allocation of addresses to UE endpoints and/or duplicated transmission of control plane messages via different control plane paths.

According to the present invention, it is preferred that the telecommunications network 100 comprises a user equipment service endpoint registry functionality 180, and in a third step, preceding the first step, pieces of endpoint-related information
- regarding the application programming interface functionality of the specific service endpoint 25 and/or
- regarding the address information related to the specific service endpoint 25, especially regarding a specific instance of the specific service endpoint 25, are provided to the user equipment service endpoint registry functionality 180, and especially thereby exposed to be used by other nodes or instances of the telecommunications network 100, especially by the respective requesting entity or the requesting network node 190. According to such an embodiment, the pieces of endpoint-related information especially enable the user equipment service endpoint registry functionality 180 to at least one out of the following:
- to register the specific application programming interface provided by the specific service endpoint 25,
- to provide address information how the specific service endpoint 25 is accessible, especially address information regarding a specific instance of the specific service endpoint 25.

Figure 7:
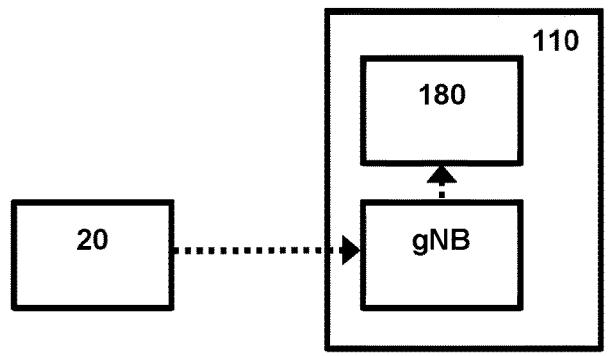
FIG. 7 schematically illustrates the user equipment service endpoint registry functionality storing pieces of endpoint-related information regarding the application programming interface functionality of the specific service endpoint of the user equipment, the user equipment service endpoint registry functionality being located in the radio access network of the telecommunications network.
Figure 8:
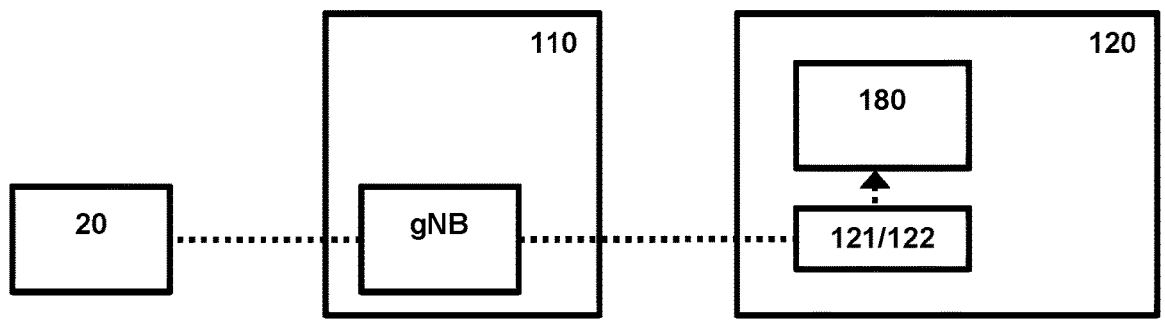
FIG. 8 schematically illustrates the user equipment service endpoint registry functionality storing pieces of endpoint-related information regarding the application programming interface functionality of the specific service endpoint of the user equipment, the user equipment service endpoint registry functionality being located in the core network of the telecommunications network.

FIGS. 7 and 8 schematically provide examples of the user equipment service endpoint registry functionality 180 registering information regarding the application programming interfaces of the service endpoints 25 of the user equipment

20. In FIG. 7, the user equipment service endpoint registry functionality 180 is schematically shown, storing pieces of endpoint-related information regarding the application programming interface functionality or functionalities of at least one but typically a plurality of the specific service endpoints 25 of the user equipment 20. The service endpoints 25 are not explicitly shown in FIG. 7. In the exemplary embodiment shown in FIG. 7, the user equipment service endpoint registry functionality 180 is located in the radio access network 110 of the telecommunications network 100, i.e. a radio resource control application programming interface registration is performed. Exemplarily, a gNB base station entity is schematically shown as part of the radio access network 110 and connected to the user equipment service endpoint registry functionality 180.

In FIG. 8, the user equipment service endpoint registry functionality 180 is schematically shown, storing pieces of endpoint-related information regarding the application programming interface functionality or functionalities of at least one but typically a plurality of the specific service endpoints 25 of the user equipment 20. The service endpoints 25 are not explicitly shown in FIG. 8. In the exemplary embodiment shown in FIG. 8, the user equipment service endpoint registry functionality 180 is located in the core network 120 of the telecommunications network 100, i.e. a non-access stratum application programming interface registration is performed. Exemplarily, a gNB base station entity is schematically shown as part of the radio access network 110 and the access and mobility management function 121 as well as the user plane function 122 are shown as part of the core network 120, connected to the user equipment service endpoint registry functionality 180. Hence, FIGS. 7 and 8 show that exposed user equipment application programming interfaces are able to be registered at the radio access network 110 level (radio resource control) or at the core network 120 level (non-access stratum), i.e. the user equipment service endpoint registry functionality 180 is part of the access network 110 of the telecommunications network 100 and/or part of the core network 120 of the telecommunications network 100. In such a situation (i.e. the pieces of endpoint-related information are related to the application programming interface functionality of the respective service endpoint 25), the user equipment service endpoint registry functionality 180 realizes the functionality of a user equipment (UE) application programming interface (API) registry (UAR).

Hence, it is thereby advantageously possible that the endpoint-related information—exposed regarding a service endpoint 25 of the user equipment 20—is able to be provided, via the user equipment service endpoint registry functionality 180, to a plurality of requesting entities or requesting network nodes, especially to network functions or network elements of the telecommunications network but also to third party network functions.

Via user equipment application programming interface registration (i.e. providing the pieces of endpoint-related information, especially regarding the application programming interface functionality of the specific service endpoint 25, to the user equipment service endpoint registry functionality 180), the radio access network 110 and/or the core network 120 can be (made) aware of the user equipment capabilities implicitly: e.g. regarding a user equipment 20 having reduced capability or capabilities, such a user equipment 20 might register less application programming interfaces, whereas regarding a user equipment 20 having more or an increased capability or capabilities, such a user equipment 20 would register more application programming interfaces. Thereby, it is advantageously possible according to the present invention that an information about which feature or features is or are supported by the respective user equipment 20 is provided to the telecommunications network 100 (i.e. to the radio access network 110 and/or to the core network 120). Hence, a user equipment 20 having less capabilities would be able to indicate this to the radio access network 110 and/or the core network 120, e.g. that it does not support certain features, such as features X, Y, Z. If the default scenario is set such that no application programming interface registration occurs in case that no capabilities are supported, it is thereby possible to eliminate the problem of capability negotiation.

Figure 5:
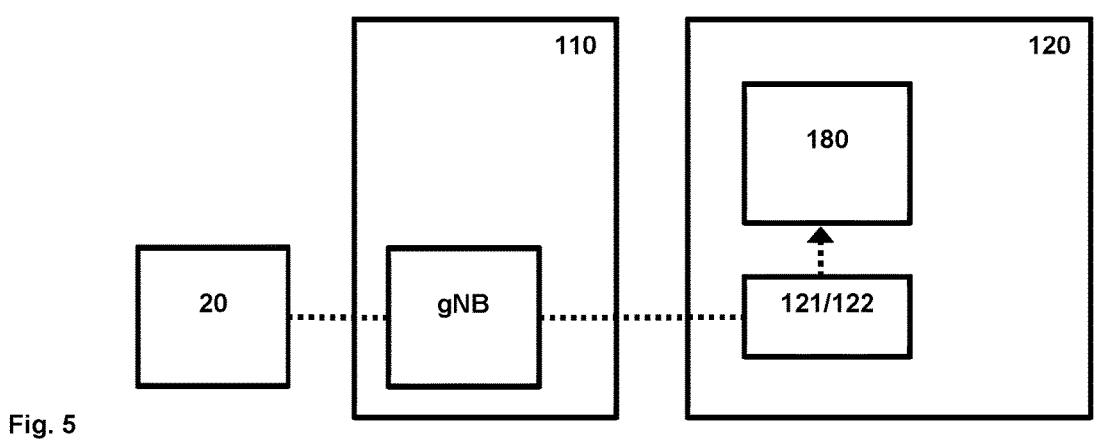
FIG. 5 schematically illustrates a user equipment service endpoint registry functionality storing pieces of endpoint-related information regarding the address information related to a specific service endpoint of the user equipment.

FIG. 5 schematically provides an example of the user equipment service endpoint registry functionality 180 registering information regarding the address information related to the specific service endpoint 25, especially regarding a specific instance of the specific service endpoint 25. The mechanisms and the description related to the embodiment according to which the pieces of endpoint-related information are pieces of endpoint-related information regarding the application programming interface functionality of the specific service endpoint 25 is also able to be applied to the embodiment according to which the pieces of endpoint-related information are pieces of endpoint-related information regarding the address information related to the specific service endpoint 25 (especially regarding a specific instance of the specific service endpoint 25). Also in this case, the pieces of endpoint-related information are provided to the user equipment service endpoint registry functionality 180, i.e. endpoint addresses (or address information related to the respective service endpoints 25) are registered into an entity (user equipment service endpoint registry functionality 180) in the core network 120, i.e. the exposed endpoint addresses or address information are thus able to be registered, again, at the radio access network level (radio resource control) and/or at the core network level (non-access stratum), e.g. at a user equipment (UE) control plane (CP) endpoint register (UCER) or user equipment endpoint registry. FIG. 5 shows the case of such a user equipment (UE) control plane (CP) endpoint register (i.e. the user equipment service endpoint registry functionality 180, especially in case that the pieces of endpoint-related information are pieces of endpoint-related information regarding the address information related to the respective service endpoint 25 being part of the core network 120: By storing in the user equipment service endpoint registry functionality 180 (or UCER or UE endpoint registry) information related to how the endpoint (i.e. the respective service endpoint 25 of the user equipment 20) is accessible (e.g. via non-access stratum, a specific PDU session, or both), core network functions are able to find an appropriate access and mobility management function and/or user plane function to use as gateway to send a respective message (request message 250) to the user equipment 20. If a given user equipment functionality (i.e. a given service endpoint 25) is exposed via several methods (e.g. via a Wifi PDU session and/or a 5G-NR (new radio) non-access stratum), corresponding signaling (i.e. the request message 250) towards the user equipment 20 is able to be sent via redundant channels towards the user equipment 20 without the need to necessarily pass through the access and mobility management function (which would be the case in conventional telecommunications networks 20 as all signaling information has to flow via an access and mobility management function).

Hence, similarly to the situation that the pieces of endpoint-related information are related to the application programming interface functionality of the respective service endpoint 25 (i.e. storing the respective information of available application programming interfaces in the core network in the manner of a service based infrastructure), also in case that the pieces of endpoint-related information are related to the address information related to the respective service endpoint 25, the respective user equipment 20 is able to register is control plane endpoints (service endpoints 25) in the core network 120. This is shown in FIG. 5, where the user equipment service endpoint registry functionality 180 stored pieces of endpoint-related information regarding the address information related to at least one but typically a plurality of the specific service endpoints 25 of the user equipment 20. The service endpoints 25 are not explicitly shown in FIG. 5. In the exemplary embodiment shown in FIG. 5, the user equipment service endpoint registry functionality 180 is located in the core network 120 of the telecommunications network 100. Exemplarily, a gNB base station entity is schematically shown as part of the radio access network 110 and the access and mobility management function 121 as well as the user plane function 122 are shown as part of the core network 120, connected to the user equipment service endpoint registry functionality 180.

Figure 9:
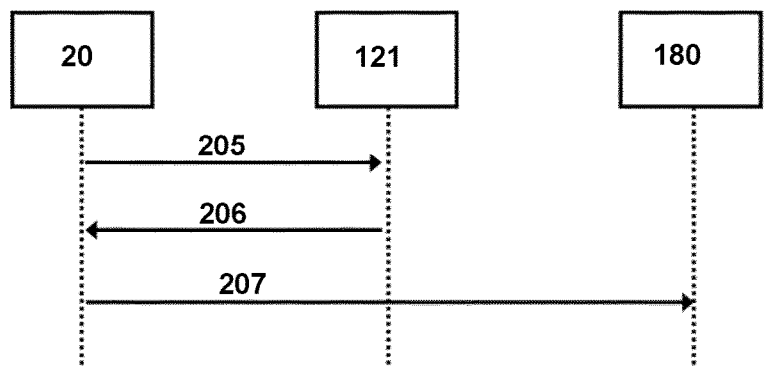
FIGS. 9 and 10 schematically illustrate communication diagrams related to the registration of a user equipment with the telecommunications network according to the present invention, wherein a registration of the application programming interface(s) of a service endpoint or of service endpoints of the user equipment is involved.
Figure 10:
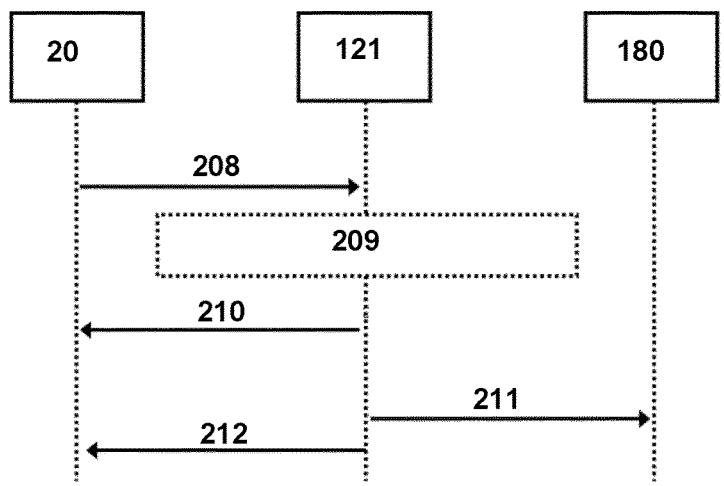

An important use case of the user equipment service endpoint registry functionality 180 according to the present invention (especially in case it realizes the user equipment (UE) application programming interface (API) registry (UAR), i.e. in case of the pieces of endpoint-related information being related to the application programming interface functionality of the respective service endpoint 25) is related to the user equipment registration with the telecommunications network 100. According to the present invention, it is proposed to relate especially the transmission—in the third step according to the method of the present invention—of the pieces of endpoint-related information towards the user equipment service endpoint registry functionality 180 to the registration of the user equipment 20 with the telecommunications network 100. In FIGS. 9 and 10, examples of such an UE API registration (i.e. the registration of the application programming interface(s) of a service endpoint or of service endpoints of the user equipment) as part of or related to the registration procedure is schematically shown via schematically illustrating the communication between the user equipment 20, the access and mobility management function 121, and the user equipment service endpoint registry functionality 180 (which is, in this case, also called user equipment (UE) application programming interface (API) registry, UAR).

FIG. 9 Shows:

In a first processing step 205, a user equipment registration request (message) is transmitted from the user equipment 20 to the access and mobility management function 121;

In a second processing step 206, a registration accept (message) is transmitted from the access and mobility management function 121 to the user equipment 20; and In a third processing step 207, the UE AP registration is transmitted or is performed, initiated by the user equipment 20 towards the user equipment service endpoint registry functionality 180, i.e. the registration of the application programming interface(s) of the service endpoints of the user equipment 20.

FIG. 10 Shows:

In a first processing step 208, both a user equipment registration request (message) is transmitted from the user equipment 20 to the access and mobility management function 121, and the UE AP registration is transmitted or is performed, initiated by the user equipment 20 towards the access and mobility management function 121;

in a second processing step 209, the supported application programming interfaces are used as criteria for the admission of the user equipment 20 to the telecommunications network 100—in case that it is determined that the user equipment 20 shall be admitted (e.g. due to the fact that specific (kinds of) application programming interfaces are available or exposed), the flow continues with a fourth processing step 211, otherwise, i.e. the user equipment 20 will not be admitted (e.g. due to the fact that one or a plurality of (kinds of) application programming interfaces are not available or not exposed), the flow continues with a third processing step 210;

in the third processing step 210, a registration reject (message) is transmitted from the access and mobility management function 121 to the user equipment 20;

in the fourth processing step 211, the UE AP registration is transmitted or is performed, initiated by the access and mobility management function 121 (but on behalf of the user equipment 20) towards the user equipment service endpoint registry functionality 180, i.e. the registration of the application programming interface(s) of the service endpoints of the user equipment 20;

in a fifth processing step 212, a registration accept (message) is transmitted from the access and mobility management function 121 to the user equipment 20.

Hence, performing the registration procedure of the user equipment 20 according to the communication diagram as represented in FIG. 10, provides the possibility to allow the access and mobility management function 121 to evaluate the user equipment capabilities for or prior to the admission of the user equipment 20 to the telecommunications network 100; according to the communication diagram of FIG. 9, the UE API registration is performed after registration accept.

According to the present invention, it is preferred that—in order to still support capability support as access condition—the telecommunications network 100 indicates to the user equipment 20 that UE API registration must be included as part of the registration request.

Figure 11:
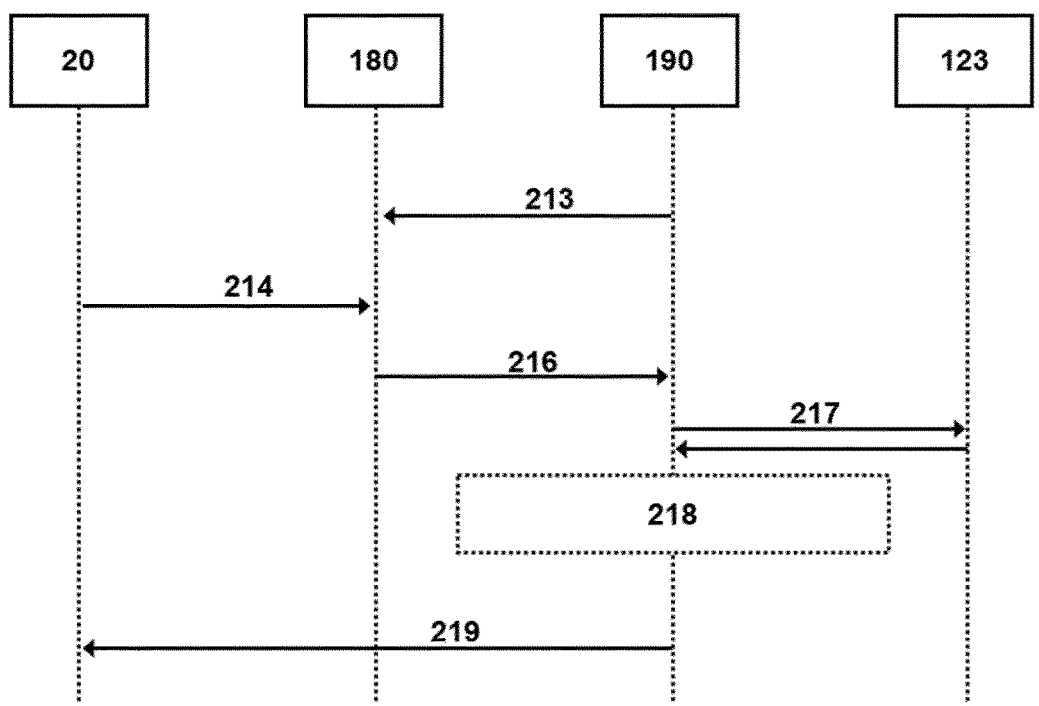
FIGS. 11 to 14 schematically illustrate communication diagrams related to various application programming interface call situations or use cases using the API registration according to the present invention.

In the following, a plurality of different use case are provided using the API registration according to the present invention:

In FIG. 11, a realization of the situation or use case is schematically shown regarding a user equipment functionality being triggered by UE API registration, especially for the case of moving a given user equipment 20 to a specific network slice and enabling low-latency communication with a specific FQDN. In this respect, FIG. 11 shows the communication between the user equipment 20, the user equipment service endpoint registry functionality 180 (or user equipment (UE) application programming interface (API) registry, UAR), the requesting entity or the requesting network node 190, and the unified data management 123 (of the telecommunications network 100).

In a first processing step 213, the requesting entity or the requesting network node 190 subscribes to be informed about such user equipments having or exposing the respective functionality in question, here: supporting low latency registers via, e.g., a command of the sort "Subscribe (UE supporting low latency registers)"; this is done via a message from the requesting entity or the requesting network node 190 to the user equipment service endpoint registry functionality 180 (or UAR).

In a second processing step 214, the user equipment 20 registers its application programming interface functionality towards the user equipment service endpoint registry functionality 180 (or UAR) via a registration message, e.g. involving the command "Register (low latency API, subscriber API+subscriber parameters)".

In a third processing step 216, the requesting entity or the requesting network node 190 is notified (due to its subscription initiated in the first processing step 213), by the user equipment service endpoint registry functionality 180 (or UAR), about the user equipment 20 exposing this application programming interface or having this capability or functionality (Notify (registration data)).

In a fourth processing step 217, the subscriber parameters are retrieved by the requesting entity or the requesting network node 190 from the unified data management 123 node or instance.

In a fifth processing step 218, the user equipment service endpoint registry functionality 180 (or UAR) evaluates if the subscriber (i.e. the user equipment 20) is allowed to use the feature in question, here: the low-latency feature. If yes, the flow is continued towards a sixth processing step 219.

In the sixth processing step 219, the requesting entity or the requesting network node 190 transmits the application programming interface call towards the user equipment 20 regarding the functionality in question, here for example according to the following command: "Instruct to authenticate to network slice X with additional credentials Y and re-establish PDU session with parameter set Z".

Hence, FIG. 11 shows an example of a trigger API call towards the user equipment 20 based on a registered user equipment application programming interface (service) on UAR (or user equipment service endpoint registry functionality 180).

Figure 12:
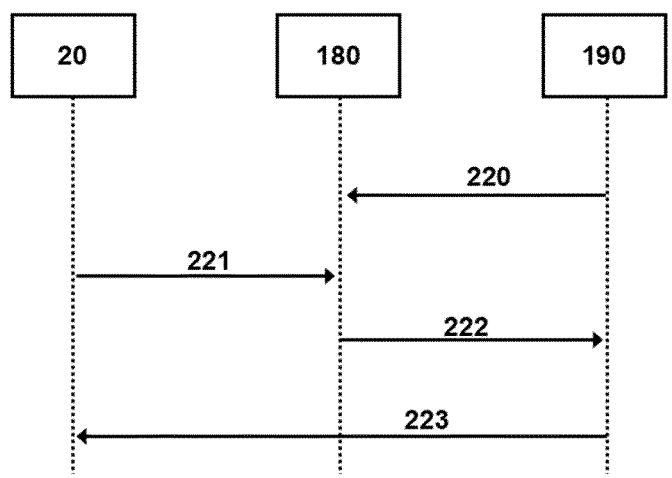

According to a further example, and similarly to the scenario shown in FIG. 11, FIG. 12 shows to add user equipment route selection policies, URSPs, if a given third party application programming interfaces are supported regardless of subscriber information.

Again, FIG. 12 shows the communication between the user equipment 20, the user equipment service endpoint registry functionality 180 (or UAR), and the requesting entity or the requesting network node 190.

In a first processing step 220, the requesting entity or the requesting network node 190 subscribes to be informed about such user equipments having or exposing the respective functionality in question, here: user equipments supporting UAV application programming interface; this is done via a message from the requesting entity or the requesting network node 190 to the user equipment service endpoint registry functionality 180 (or UAR).

In a second processing step 221, the user equipment 20 registers its application programming interface functionality towards the user equipment service endpoint registry functionality 180 (or UAR) via a registration message, e.g. involving the command "Register (UAV application programming interface, URSP application programming interface)".

In a third processing step 222, the requesting entity or the requesting network node 190 is notified (due to its subscription initiated in the first processing step 220), by the user equipment service endpoint registry functionality 180 (or UAR), about the user equipment 20 exposing this application programming interface or having this capability or functionality (Notify (registration data)).

In a fourth processing step 223, the requesting entity or the requesting network node 190 transmits the application programming interface call towards the user equipment 20 regarding the functionality in question, here for example according to the following command: "Set URSP rule(s) so that streamed uplink UAV video gets specific quality-of-service applied". Hence, FIG. 12 shows an example of a trigger URSP API call based on a combination of registered APIs (in this case, no subscriber information is required).

Figure 13:
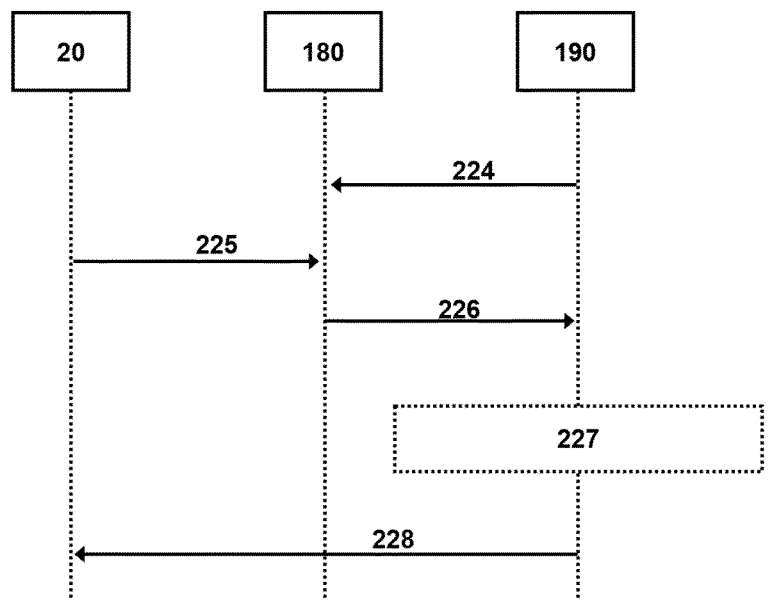

According to a further example, and similarly to the scenarios shown in FIGS. 11 and 12, FIG. 13 shows to write parameters belonging to another subscription, especially to another public land mobile network. Again, FIG. 13 shows the communication between the user equipment 20, the user equipment service endpoint registry functionality 180 (or UAR), and the requesting entity or the requesting network node 190 (especially of that other public land mobile network).

In a first processing step 224, the requesting entity or the requesting network node 190 subscribes to be informed about such user equipments having or exposing the respective functionality in question, here: user equipments supporting subscriptions for a specific public land mobile network (e.g. PLMN X) via, e.g., a command of the sort "Subscribe (UE supporting subscriptions for PLMN X and PLMN Y)"; this is done via a message from the requesting entity or the requesting network node 190 to the user equipment service endpoint registry functionality 180 (or UAR).

In a second processing step 225, the user equipment 20 registers its application programming interface functionality towards the user equipment service endpoint registry functionality 180 (or UAR) via a registration message, e.g. involving the command "Register (subscriber API, subscription data X [i.e. for PLMN X], subscription data Y [i.e. for PLMN Y])".

In a third processing step 226, the requesting entity or the requesting network node 190 is notified (due to its subscription initiated in the first processing step 224), by the user equipment service endpoint registry functionality 180 (or UAR), about the user equipment 20 exposing this application programming interface or having this capability or functionality (Notify (registration data)).

In a fourth processing step 227, the requesting entity or the requesting network node 190 evaluates the agreement of the parameters between both networks, i.e. PLMN X and PLMN Y; if the subscriber (i.e. the user equipment 20) is allowed to use the feature in question (or if the subscriber credentials or parameters are in agreement), here: to use PLMN X, the flow is continued towards a fifth processing step 228.

In the fifth processing step 228, the requesting entity or the requesting network node 190 transmits the application programming interface call towards the user equipment 20 regarding the functionality in question, here for example according to the following command: "Instruct the subscriber API-Y (in the user equipment 20) to set PLMN X as an allowed preferred roaming partner for a given location", this requiring an interaction with the subscriber identity module (SIM card) of PLMN Y in the user equipment 20

Hence, FIG. 13 shows an example of setting credential data on the user equipment 20 by a third party network provider.

Figure 14:
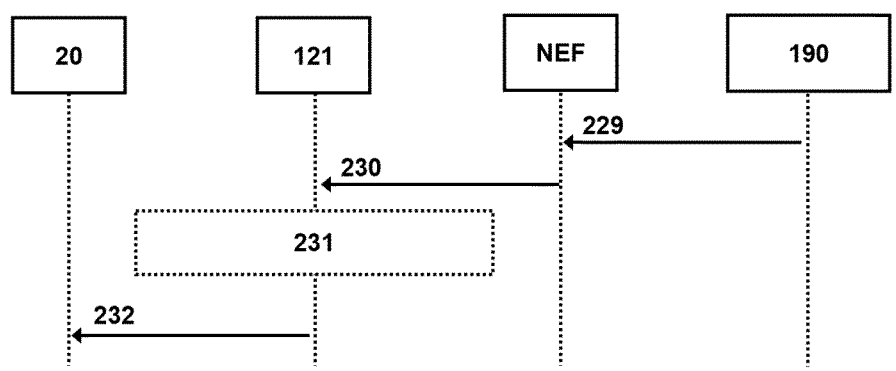

For a final example, FIG. 14 shows that the exposed application programming interface (of the user equipment 20) may require authentication and/or authorization so that a network function belonging to PLMN X (the term PLMN is meant here only as an example of a network; it also encompasses the general sense of "network", as this could also apply to private networks, which are not PLMNs) is only allowed to operate on certain parts of subscriber-API-Y of the user equipment 20 and not on everything.

Such a method would also be applicable when having an intermediate API gateway function (e.g. NEF, SCEF), as well as when the service base infrastructure message(s) are transmitted via non-access stratum protocol. For this, a method for addressing endpoints over non-access stratum within the user equipment 20 is required, which is provided separately (this is able to be used independently of whether the endpoint is an API or not).

FIG. 14 shows the communication between the user equipment 20, the access and mobility management function 121, a network exposure function NEF, and the requesting entity or the requesting network node 190.

In a first processing step 229, the requesting entity or the requesting network node 190 requests parameters, and transmits a message to the network exposure function NEF.

In a second processing step 230, the network exposure function NEF requests parameters, and transmits a message to the access and mobility management function 121.

In a third processing step 231, the access and mobility management function 121 sets up a tunnel for service based infrastructure (API) message(s) over non-access stratum transport protocol.

In a fourth processing step 232, the access and mobility management function 121 transmits a non-access stratum message, comprising the request for parameters, to the user equipment 20, hence realizing an indirect API access via intermediate GW (e.g. NEF) and tunneling of SBI message over non-access stratum.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a user equipment within a telecommunications network, the method comprising:
providing, by the user equipment, pieces of endpoint-related information regarding an application programming interface of a specific service endpoint of the user equipment to a user equipment service endpoint registry functionality for use by a plurality of network nodes of the telecommunications network, wherein the user equipment service endpoint registry functionality is part of an access network of the telecommunications network or part of a core network of the telecommunications network, wherein the provision of pieces of endpoint-related information is part of a network registration procedure of the user equipment with the telecommunications network, and wherein the pieces of endpoint-related information define the application programming interface that the specific service endpoint of the user equipment is able to provide to the plurality of network nodes of the telecommunications network, and enable the user equipment service endpoint registry functionality to:
register the application programming interface provided by the specific service endpoint; and/or
provide address information for accessing the specific service endpoint;
receiving, by the user equipment, from a requesting network node part of the access network of the telecommunications network or part of the core network of the telecommunications network, a request message related to the application programming interface provided by the specific service endpoint of the user equipment, wherein the request message corresponds to an application programming interface call message to be received and processed by the specific service endpoint and comprises address information related to the specific service endpoint; and
processing, by the specific service endpoint, the received request message;
wherein operation of the user equipment within the telecommunications network is conducted using a control plane functionality, wherein the specific service endpoint of the user equipment is related to the control plane functionality, and wherein the specific service endpoint communicates with a control plane network element of the telecommunications network via a control plane channel; and
wherein the core network of the telecommunications network provides the user equipment with data connectivity towards a data network.

2. The method according to claim 1, wherein a control plane channel acts as transport channel for a user plane channel via encapsulation or vice-versa.

3. The method according to claim 1, wherein the request message corresponds to at least one out of the following:
a non-access stratum message; or
a radio resource control message.

4. The method according to claim 1, wherein the request is received from the requesting network node, wherein the requesting network node corresponds to at least one out of the following components within a 5G system or an IP multimedia subsystem (IMS system):
a gNB;
an access and mobility management function (AMF);
a session management function (SMF);
a user plane function (UPF);
a unified data management (UDM) function;
a policy and charging function (PCF);
a short message service function (SMSF);
a non-3GPP interworking function (N3IWF);
a charging function (CHF);
a network exchange function (NEF);
a network data analytics function (NWDAF);

a network repository function (NRF);
a gateway mobile location center (GMLC);
a serving call state control function (S-CSCF);
a proxy call state control function (P-CSCF); or
an interrogating call state control function (I-CSCF).

5. The method according to claim 1, wherein the specific service endpoint exposes one or more of the following functionalities:
mobility management,
session management,
short message service,
user equipment policy,
location services,
universal subscriber identity module (USIM), or
IP multimedia subsystem managed object (IMS MO).

6. The method according to claim 1, wherein the user equipment exposes at least two specific service endpoints and/or specific application programming interfaces of the same type; or
wherein the user equipment exposes at least two instances of the specific service endpoint or the application programming interface.

7. The method according to claim 1, wherein the specific service endpoint corresponds to a functionality of the user equipment and/or to a variable of the user equipment and/or to a device or module of the user equipment.

8. A user equipment, comprising:
a memory having processor-executable instructions stored thereon; and
a processor configured to execute the processor-executable instructions to facilitate performance of the following by the user equipment:
providing, by the user equipment, pieces of endpoint-related information regarding an application programming interface of a specific service endpoint of the user equipment to a user equipment service endpoint registry functionality for use by a plurality of network nodes of the telecommunications network, wherein the user equipment service endpoint registry functionality is part of an access network of the telecommunications network or part of a core network of the telecommunications network, wherein the provision of pieces of endpoint-related information is part of a network registration procedure of the user equipment with the telecommunications network, and wherein the pieces of endpoint-related information define an application programming interface that the specific service endpoint of the user equipment is able to provide to the plurality of network nodes of the telecommunications network, and enable the user equipment service endpoint registry functionality to:
register the application programming interface provided by the specific service endpoint; and/or
provide address information for accessing the specific service endpoint;
receiving, by the user equipment, from a requesting network node part of the access network of the telecommunications network or part of the core network of the telecommunications network, a request message related to the application programming interface provided by the specific service endpoint of the user equipment, wherein the request message corresponds to an application programming interface call message to be received and processed by the specific service endpoint and comprises address information related to the specific service endpoint; and
processing, by the specific service endpoint, the received request message;
wherein operation of the user equipment within the telecommunications network is conducted using a control plane functionality, wherein the specific service endpoint of the user equipment is related to the control plane functionality, and wherein the specific service endpoint communicates with a control plane network element of the telecommunications network via a control plane channel; and
wherein the core network of the telecommunications network provides the user equipment with data connectivity towards a data network.

9. A non-transitory computer-readable medium having processor-executable instructions stored thereon for operating a user equipment within a telecommunications network, wherein the processor-executable instructions, when executed, facilitate performance of the following:
providing, by the user equipment, pieces of endpoint-related information regarding an application programming interface of a specific service endpoint of the user equipment to a user equipment service endpoint registry functionality for use by a plurality of network nodes of the telecommunications network, wherein the user equipment service endpoint registry functionality is part of an access network of the telecommunications network or part of a core network of the telecommunications network, wherein the provision of pieces of endpoint-related information is part of a network registration procedure of the user equipment with the telecommunications network, and wherein the pieces of endpoint-related information define an application programming interface that the specific service endpoint of the user equipment is able to provide to the plurality of network nodes of the telecommunications network, and enable the user equipment service endpoint registry functionality to:
register the application programming interface provided by the specific service endpoint; and/or
provide address information for accessing the specific service endpoint;
receiving, by the user equipment, from a requesting network node part of the access network of the telecommunications network or part of the core network of the telecommunications network, a request message related to the application programming interface provided by the specific service endpoint of the user equipment, wherein the request message corresponds to an application programming interface call message to be received and processed by the specific service endpoint and comprises address information related to the specific service endpoint; and
processing, by the specific service endpoint, the received request message;
wherein operation of the user equipment within the telecommunications network is conducted using a control plane functionality, wherein the specific service endpoint of the user equipment is related to the control plane functionality, and wherein the specific service endpoint communicates with a control plane network element of the telecommunications network via a control plane channel; and
wherein the core network of the telecommunications network provides the user equipment with data connectivity towards a data network.

* * * * *